US008994781B2

(12) United States Patent
Anderson et al.

(10) Patent No.: US 8,994,781 B2
(45) Date of Patent: Mar. 31, 2015

(54) CONTROLLING AN ELECTRONIC CONFERENCE BASED ON DETECTION OF INTENDED VERSUS UNINTENDED SOUND

(71) Applicant: Citrix Systems, Inc., Fort Lauderdale, FL (US)

(72) Inventors: Matt Anderson, New York, NY (US); Cagdas Evren Gerede, San Francisco, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 96 days.

(21) Appl. No.: 13/781,976

(22) Filed: Mar. 1, 2013

(65) Prior Publication Data
US 2014/0247319 A1 Sep. 4, 2014

(51) Int. Cl.
H04N 7/14 (2006.01)
H04N 7/15 (2006.01)
H04L 12/18 (2006.01)

(52) U.S. Cl.
CPC .............. H04N 7/15 (2013.01); H04L 12/1827 (2013.01)
USPC .................... 348/14.08; 379/202.01; 379/421

(58) Field of Classification Search
CPC ......... H04N 7/15; H04N 7/147; H04N 7/152; H04N 7/141
USPC ............ 348/14.01, 14.08, 14.09; 379/202.01, 379/421
See application file for complete search history.

(56) References Cited

U.S. PATENT DOCUMENTS

| 6,950,122 | B1 | 9/2005 | Mirabile |
| 7,080,014 | B2 | 7/2006 | Bush et al. |
| 7,609,721 | B2 | 10/2009 | Rao et al. |
| 7,768,543 | B2 | 8/2010 | Christiansen |
| 8,325,896 | B2 | 12/2012 | Alexandrov et al. |
| 8,520,821 | B2 | 8/2013 | Alexandrov et al. |
| 2005/0078172 | A1* | 4/2005 | Harville et al. ............. 348/14.09 |
| 2008/0118082 | A1* | 5/2008 | Seltzer et al. ................ 381/94.1 |
| 2008/0279366 | A1* | 11/2008 | Lindbergh .................... 379/421 |
| 2010/0145689 | A1* | 6/2010 | Li et al. ......................... 704/210 |
| 2010/0145701 | A1 | 6/2010 | Kaneko et al. |
| 2011/0019810 | A1 | 1/2011 | Alexandrov et al. |
| 2011/0102540 | A1* | 5/2011 | Goyal et al. ................ 348/14.08 |
| 2012/0014514 | A1* | 1/2012 | Enbom et al. .............. 379/32.01 |
| 2012/0051533 | A1* | 3/2012 | Byrne et al. ............. 379/204.01 |
| 2012/0290950 | A1 | 11/2012 | Rapaport et al. |

FOREIGN PATENT DOCUMENTS

EP 1868363 A1 12/2007
JP 2008109595 A 5/2008

* cited by examiner

*Primary Examiner* — Quoc D Tran
(74) *Attorney, Agent, or Firm* — BainwoodHuang

(57) ABSTRACT

A technique manages an electronic conference. The technique involves receiving a set of audio signals from a set of participants of the electronic conference, each audio signal being received from a respective participant. The technique further involves categorizing the set of audio signals received from the set of participants, each audio signal being individually categorized as currently representing (i) intentional participant sound or (ii) unintentional participant sound. The technique further involves controlling operation of the electronic conference based on the categorized set of audio signals.

21 Claims, 5 Drawing Sheets

CONTROLLING AN ELECTRONIC CONFERENCE BASED ON DETECTION OF INTENDED VERSUS UNINTENDED SOUND

BACKGROUND

A conventional web meeting typically shares visual and voice data among multiple meeting members. To create a web meeting, the meeting members connect their client devices to a meeting server (e.g., through the Internet). The meeting server typically processes visual data (e.g., a desktop view from a presenting member, a camera view from each meeting member, etc.) and displays that visual data on the display screens of the meeting members so that all of the meeting members are able to view the same visual data. Additionally, the meeting server typically combines voice data from all of the meeting members into a combined audio feed, and shares this combined audio feed with all of the meeting members. Accordingly, meeting members are able to watch visual content, as well as ask questions and inject comments to form a collaborative exchange even though the meeting members may be distributed among remote locations.

For some conventional web meetings, the meeting server displays audio information on the display screens of the meeting members to enable the meeting members to determine who is currently talking. For example, the meeting server may display a volume meter for each meeting member (i.e., a current volume level for each meeting member). As another example, the meeting server may display a list of names to identify who is currently talking.

SUMMARY

Unfortunately, there are deficiencies to the above-described conventional web meeting that simply combines voice data from all of the meeting members into a combined audio feed, and shares the combined audio feed with all of the meeting members. In particular, the quality of the experience of such a conventional web meeting is lowered when unintended noise is introduced by one or more of the meeting members. Examples of such unintended noise include keyboard typing, mouse clicking, and paper movement by a non-presenting meeting member. Other examples of such unintended noise include environmental sounds such as background and crowd noises, machinery and automobile noises, and so on which are inadvertently picked up by the client devices of the meeting members.

Not only may such unintended noise frustrate the meeting members, it can be embarrassing to a particular meeting member once that meeting member finds out that he or she was the source of the unintended noise during the meeting (i.e., the noisy attendee). Moreover, meeting members may refrain from informing a noisy meeting member that others can hear because the meeting members do not want to seem rude or further worsen the quality of the experience.

In contrast to the above-described conventional web meetings which are susceptible to unintended noise thus reducing the quality of the experience, improved techniques are directed to controlling an electronic conference based on detection of intended versus unintended sound. In particular, audio signals from conference participants are categorized as representing either intentional participant sound or unintentional participant sound using contextual factors. Such contextual factors may include language/word detection, sound volume, sound repetitiveness, sound duration, sound history/participation level, participant location, comparison results to determine the current active speaker, etc. Once the audio signals have been categorized, a variety of actions are available to enhance the quality of the experience such as adjusting sound levels (e.g., modifying aspects of audio signals categorized as currently carrying unintentional participant sound), altering user behavior (e.g., outputting an alert or indicator), and so on.

One embodiment is directed to a method of managing an electronic conference. The method includes receiving a set of audio signals from a set of participants of the electronic conference, each audio signal being received from a respective participant. The method further includes categorizing the set of audio signals received from the set of participants, each audio signal being individually categorized as currently representing (i) intentional participant sound or (ii) unintentional participant sound. The method further includes controlling operation of the electronic conference based on the categorized set of audio signals.

In some arrangements, categorizing the set of audio signals includes (i) identifying a set of contextual factors of a particular audio signal from a particular participant, and (ii) providing a categorization result for the particular audio signal based on the set of contextual factors. Accordingly, the categorization result may be based at least in part on contextual factors such as whether the particular participant is actively speaking, whether the particular participant is using multiple microphones, whether the particular audio signal includes human speech, and so on.

In some arrangements, the categorization result is further based on non-audio data from the particular participant. Such non-audio data may include a geographical location of the particular participant (e.g., to determine whether the participant is in a private office setting or a public retail area), a video image (e.g., to determine whether the participant is in front of a webcam or microphone), location history (e.g., to determine whether the participant is moving in a car), and so on.

In some arrangements, the controlled operation may involve modifying a set of sound components (e.g., adjusting a set of volume levels, filtering, etc.) when mixing audio signals to produce an aggregate audio signal which is delivered among the participants. For example, an audio engine of a conference server may reduce the individual volume levels of audio signals categorized as currently representing unintentional sound while maintaining the individual volume level of one or more audio signals categorized as currently representing intentional sound.

In some arrangements, the controlled operation may involve outputting an alert upon detection of an audio signal representing unintentional sound. For example, the audio engine of the conference server may provide a visual notification or a sound indicator to one or more of the participants.

In some arrangements, the method further includes, prior to categorizing the set of audio signals received from the set of participants, analyzing the set of audio signals to determine whether at least two audio signals concurrently represent audio activity (e.g., human talking, noise, etc.). In these arrangements, categorizing the set of audio signals is performed by the electronic device in response to a determination that at least two audio signals simultaneously represent audio activity. That is, in these arrangements, categorization is not ongoing. Rather, categorization occurs only when there is detection of concurrent audio activity among the audio signals. Accordingly, any potential conflict may be automatically and quickly detected and resolved to improve the quality of the experience.

In some arrangements, controlling the operation is performed within the conference server. In other arrangements, controlling the operation is performed within the client devices of the participants (e.g., desktop workstations, laptops, tablet devices, smart phones, etc.). In yet other arrangements, controlling the operation occurs via involvement of multiple devices, e.g., the conference server, client devices, intermediate and/or additional devices, combinations thereof, etc.

Other embodiments are directed to computerized systems and apparatus, control circuitry, computer program products, and so on. Some embodiments are directed to various methods, computerized components and circuits which are involved in managing an electronic conference.

It should be understood that, in the cloud context, the conference server may be formed by remote computer resources distributed over a network. Such a distributed environment is capable of providing certain advantages such as enhanced fault tolerance, load balancing, processing flexibility, high file availability, etc.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to controlling an electronic conference based on detection of intended versus unintended sound. In particular, audio signals from conference participants are categorized as representing either intentional participant sound or unintentional participant sound via contextual factors. Such contextual factors may include, for each audio signal, language/word detection, sound volume, sound repetitiveness, sound duration, sound history/participation level, participant location, a determination of the current active speaker, and so on. Once the audio signals have been categorized, a variety of actions are available to enhance the quality of the experience such as modifying aspects of audio signals (e.g., adjusting sound levels of audio signals categorized as currently carrying unintentional participant sounds) and/or altering user behavior (e.g., outputting alerts or indicators to inform the participants causing the unintended sounds).

Figure 1:
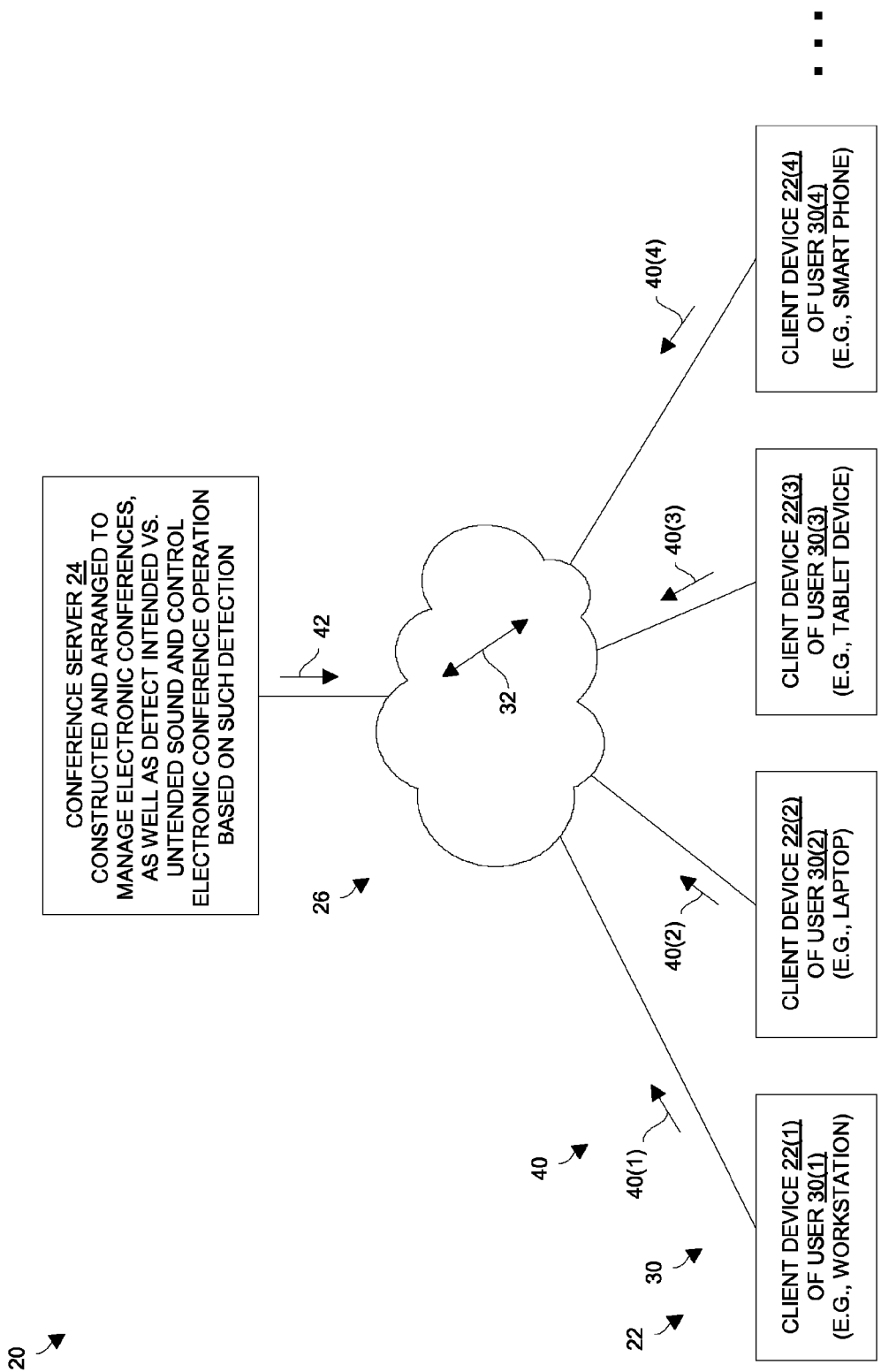
FIG. 1 is a block diagram of an electronic environment in which an electronic conference is controlled based on detection of intended versus unintended sound.

FIG. 1 shows an electronic environment 20 which controls electronic conferencing operation based on detection of intended versus unintended sound. The electronic environment 20 includes client devices 22(1), 22(2), 22(3), 22(4), ... (collectively, client devices 22), a conference server 24, and a communications medium 26.

Each client device 22 is constructed and arranged to perform useful work on behalf of respective user 30. Along these lines, each client device 22 enables its respective user 30 to participate in an electronic conference, i.e., an online meeting. By way of example only, the client device 22(1) is a computerized workstation operated by a user 30(1). Additionally, the client device 22(2) is a laptop computer operated by a user 30(2), the client device 22(3) is a tablet device operated by a user 30(3), the client device 22(4) is a smart phone operated by a user 30(4), and so on.

The conference server 24 is constructed and arranged to manage electronic conferences among the users 24. Additionally, the conference server 24 is constructed and arranged to detect intended sound and unintended sound, and control the operation of the electronic conferences based on such detection.

The communications medium 26 is constructed and arranged to connect the various components of the electronic environment 20 together to enable these components to exchange electronic signals 32 (e.g., see the double arrow 32). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, and so on. Furthermore, some portions of the communications medium 26 may be publicly accessible (e.g., the Internet), while other portions of the communications medium 26 are restricted (e.g., a private LAN, etc.).

During operation, each client device 22 provides a respective set of participant signals 40(1), 40(2), 40(3), 40(4) (collectively, participant signals 40) to the conference server 24. Each set of participant signals 40 may include a video signal representing participant video (e.g., a feed from a webcam, a presenter's desktop or slideshow, etc.), an audio signal representing participant audio (e.g., an audio feed from a participant headset, an audio feed from a participant's phone, etc.), and additional signals (e.g., connection and setup information, a participant profile, client device information, status and support data, etc.).

Upon receipt of the sets of participant signals 40 from the client devices 22, the conference server 24 processes the sets of participant signals 40 and returns a set of conference signals 42 to the client devices 22. In particular, the set of conference signals 42 may include a video signal representing the conference video (e.g., combined feeds from multiple webcams, a presenter's desktop or slideshow, etc.), an audio signal representing the conference audio (e.g., an aggregate audio signal which includes audio signals from one or more of the participants mixed together, etc.), and additional signals (e.g., connection and setup commands and information, conference information, status and support data, etc.).

As will be discussed in further detail shortly, during an electronic conference, the conference server 24 is constructed and arranged to improve the quality of the experience of the users 30 by detecting which sets of participant signals 40 carry intended sound and which sets of participant signals 40 carry unintended sound. Based on such detection, the conference server 24 controls the operation of the electronic conference. For example, if the conference server 24 detects unintended sound, the conference server 24 may adjust the sound response of the aggregate audio signal provided back to the client devices 22 (see the set of conference signals 42 in FIG. 1). As another example, the conference server 24 may provide an alert (e.g., a sound or visual indicator) to adjust user behavior. Other alternatives are available as well such as an adjusted sound response in combination with an alert indicating unintended sound, customized and different sets of conference signals 42, and so on. Further details will now be provided with reference to FIG. 2.

Figure 2:
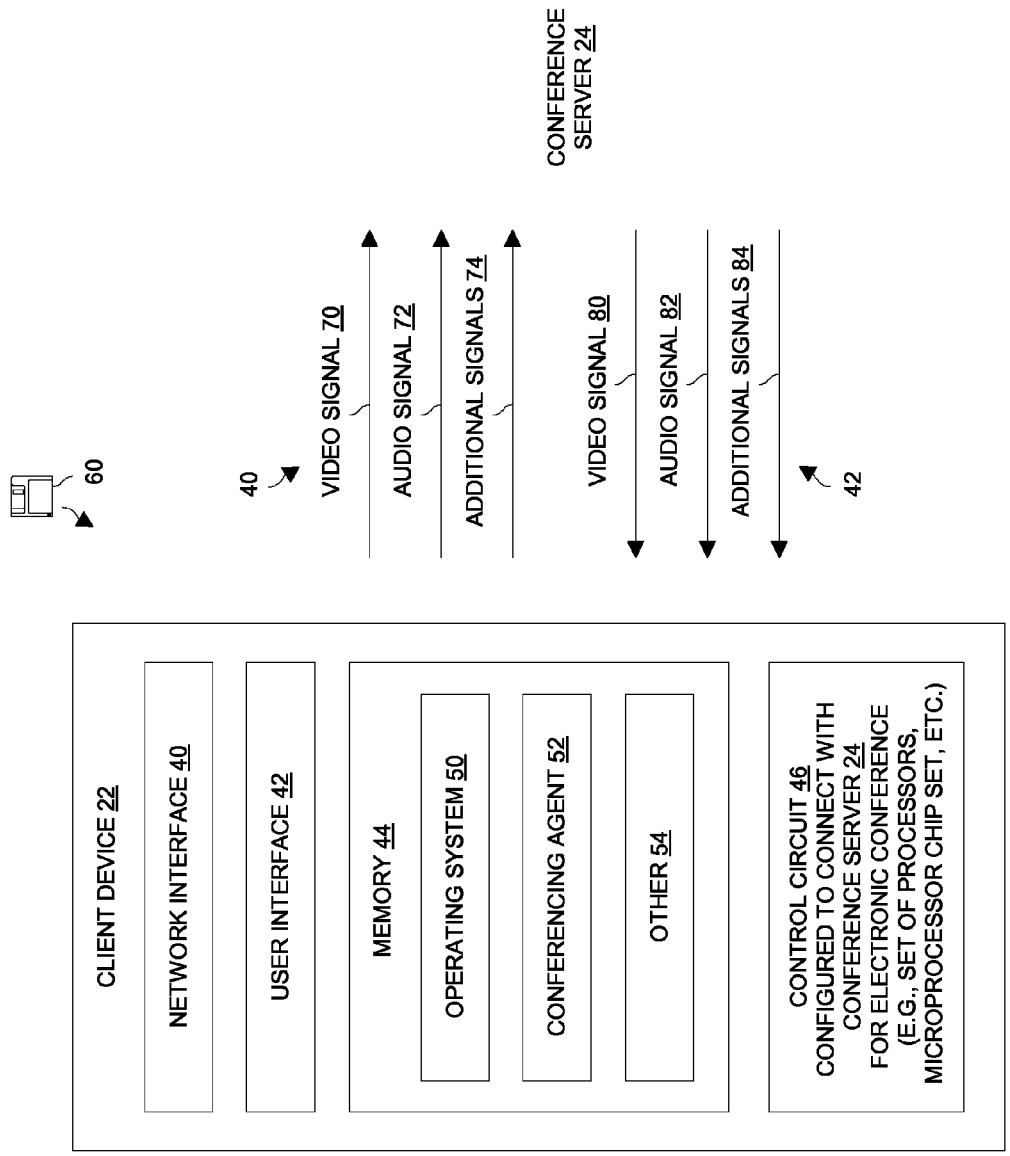
FIG. 2 is a block diagram of a client device of the electronic environment of FIG. 1.

FIG. 2 shows particular details of a client device 22 which is suitable for use in the electronic environment 20 of FIG. 1. The client device 22 includes a network interface 40, a user interface 42, memory 44, and a control circuit 46.

The network interface 40 is constructed and arranged to connect the client device 22 to the communications medium 26 for copper-based and/or wireless communications (i.e., IP-based, cellular, etc.). In the context of a user workstation or general purpose computer, the network interface 40 may take the form of a network interface card (NIC). In the context of a laptop or other mobile device, the network interface 40 may take the form of a wireless transceiver. Other networking technologies are available as well (e.g., fiber optic, Bluetooth, combinations thereof, etc.).

The user interface 42 is constructed and arranged to receive input from a user and provide output to the user. In the context of a user workstation or a general purpose computer, the user interface 42 may include a keyboard, a mouse, a microphone and a webcam for user input, and a monitor and a speaker for user output. In the context of a tablet or a similar mobile device, the user interface 42 may include mobile phone components (e.g., a microphone and a speaker) and a touch screen. Other user I/O technologies are available as well (e.g., a user headset, a hands-free peripheral, and so on).

The memory 44 stores a variety of memory constructs including an operating system 50, a conferencing agent 52, and other constructs and data 54 (e.g., user applications, a user profile, status and support data, etc.). Although the memory 44 is illustrated as a single block in FIG. 2, the memory 44 is intended to represent both volatile and non-volatile storage.

The control circuit 46 is configured to run in accordance with instructions of the various memory constructs stored in the memory 44. Such operation enables the client device 22 to perform useful work on behalf of a user 30. In particular, the control circuit 46 runs the operating system 50 to manage client resources (e.g., processing time, memory allocation, etc.). Additionally, the control circuit 46 runs the conferencing agent 52 to participate in electronic conferences.

The control circuit 46 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the client device 22. The computer program product 60 has a non-transitory (or non-volatile) computer readable medium which stores a set of instructions which controls one or more operations of the client device 22. Examples of suitable computer readable storage media include tangible articles of manufacture and apparatus which store instructions in a non-volatile manner such as CD-ROM, flash memory, disk memory, tape memory, and the like.

During an electronic conference, the control circuit 46 running in accordance with the conferencing agent 52 provides a set of participant signals 40 to the conference server 24 (FIG. 1). Additionally, the control circuit 46 receives a set of conference signals 42 from the conference server 24.

As mentioned earlier, the set of participant signals 40 includes a video signal 70 (e.g., a feed from a webcam, a presenter's desktop or slideshow, etc.), an audio signal 72 (e.g., an audio feed from a participant headset, an audio feed from a participant's phone, etc.), and additional signals 74 (e.g., connection and setup commands and information, a participant profile, client device information, status and support data, etc.). It should be understood that one or more of these signals 70, 72, 74 may be bundled together into a single transmission en route to the conference server 24 through the communications medium 26 (e.g., a stream of packets, etc.).

As also mentioned earlier, the set of conference signals 42 includes a video signal 80 (e.g., combined feeds from multiple webcams, a presenter's desktop or slideshow, etc.), an audio signal 82 (e.g., an aggregate audio signal which includes audio signals from one or more of the participants mixed together, etc.), and additional signals 84 (e.g., connection and setup commands and information, conference information, status and support data, etc.). Again, one or more of these signals 80, 82, 84 may be bundled together into a single transmission from the conference server 24 through the communications medium 26.

The client device 22 may perform certain operations based on detection of intended versus unintended sound during an electronic conference to improve the quality of the experience of the users 30. For example, the client device 22 may output an alert (or indicator) to the user 30 who is controlling the client device 22 to inform that user 30 that the user 30 is contributing unintended sound to the electronic conference. Such an alert may be provided from the conference server 24 based on categorization of all of the audio signals 72 received by the conferencing server 24 from all of the client devices 22 as representing intended participant sound or unintended participant sound.

It should be understood that the particular details of the client device 22 shown in FIG. 2 are provided by way of example only. In other arrangements, the client device 22 has a different architecture/form factor/etc. For example, the client device 22 may be or include a simple cellular phone which communicates through at least a portion of a cellular network to reach the conference server 24. As another example, the client device 22 may be or include a simple telephone which communicates through the plain old telephone service (POTS) to the conference server 24. Further details will now be provided with reference to FIG. 3.

Figure 3:
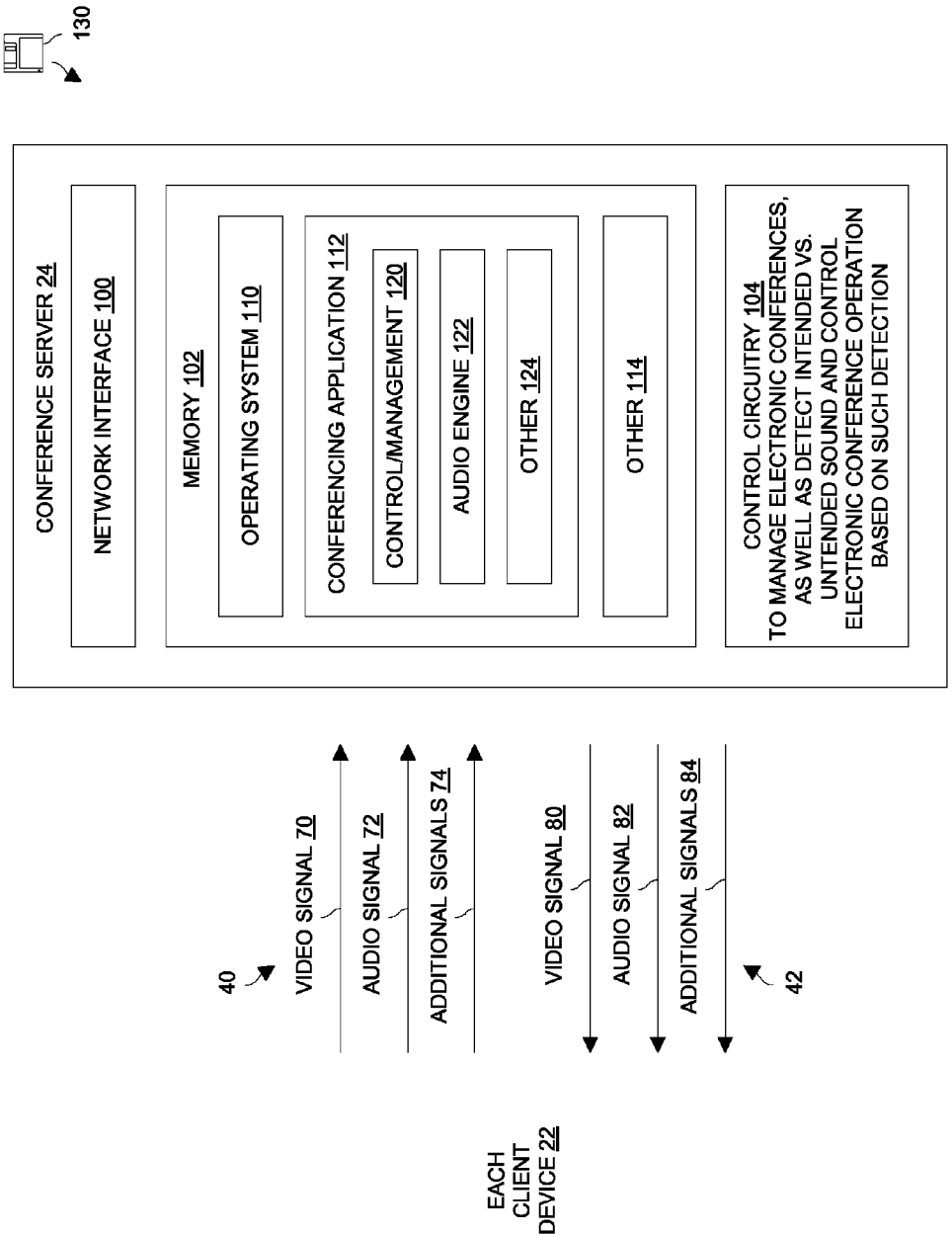
FIG. 3 is a block diagram of a conference server of the electronic environment of FIG. 1.

FIG. 3 shows particular details of the conference server 24 (also see FIG. 1). The conference server 24 includes a network interface 100, memory 102, and control circuitry 104.

The network interface 100 is constructed and arranged to connect the conference server 24 to the communications medium 26 to reach other electronic devices such as the client devices 22 (also see FIGS. 1 and 2). In some arrangements, the network interface 100 is provisioned with several ports to simultaneously conduct multiple electronic conferences, each of which may involve multiple participating client devices 22.

The memory 102 stores a variety of memory constructs including an operating system 110, a conferencing application 112, and other constructs and data 114 (e.g., utilities, a user databases, status and support data, etc.). The conferencing application 112 includes a variety of specialized parts such as a control/management module 120 (e.g., for server control, administration, etc.), an audio engine 122 (e.g., for categorizing, adjusting and mixing audio signals 72), and other components 124 (e.g., video processing, databases, utilities, etc.). Although the memory 102 is illustrated as a single block in FIG. 3, the memory 102 is intended to represent both volatile and non-volatile storage.

The control circuitry 104 is configured to run in accordance with instructions of the various memory constructs stored in the memory 102. In particular, the control circuitry 104 runs the operating system 110 to manage server resources (e.g., processing time, memory allocation, etc.). Additionally, the control circuitry 104 runs the conferencing application 112 to provide electronic conferencing services.

The control circuitry 104 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 130 is capable of delivering all or portions of the software to the conference server 24. The computer program product 130 has a non-transitory (or non-volatile) computer readable medium which stores a set of instructions which controls one or more operations of the conference server 24.

In some arrangements, the control circuitry 104 includes specialized circuitry to perform particular conference operations. For example, the control circuitry 104 may include a video encoder to process video signals 70, an audio bridge to process audio signals 72, and so on.

During an electronic conference, the control circuitry 104 running in accordance with the conferencing application 112 receives a respective set of participant signals 40 from each client device 22 participating in the electronic conference (FIGS. 1 and 2). Additionally, the control circuitry 104 provides a set of conference signals 42 to each client device 22. The individual signals of these signal sets 40, 42 were mentioned earlier in connection with FIG. 2.

It should be understood that there are a variety of ways to begin an electronic conference. For example, some users 30 may have desktop computers or tablets as client devices 22 and connect to the conference server 24 by clicking on a link in an email entry, calendar entry or web browser. As another example, some users 30 may have smart phones, VoIP phones or standard POTS phones and simply call into the conference server 24.

Once the electronic conference is underway, the control circuitry 104 of the conference server 24 receives and categorizes the set of audio signals 72 from the client devices 22 to determine whether each audio signal 72 represents intended participant sound (e.g., voice) or unintended participant sound (e.g., background conversations, typing or mouse clicks, street noise, etc.). Moreover, for each client device 22 that connects to the conference server 24 via an identifiable connection (e.g., an IP connection rather than an anonymous dial-in), the conference server 24 is able to control the video and audio content to that client device 22 in an individually tailored manner (i.e., sending a different conference signal to each client device 22).

After the control circuitry 104 categorizes each audio signal 72 as representing intended or unintended participant sound, the control circuitry 104 controls the operation of the electronic conference based on the categorized set of audio signals 72. In some arrangements, the control circuitry 104 adjusts the conference sound response (e.g., lowers or filters certain audio signals 72 carrying unintended participant sound, raises or augments certain audio signals 72 carrying intended participant sound, etc.). In other arrangements, the control circuitry 104 provides a response to adjust user behavior (e.g., provides an alert to the client devices 22 which are sources of unintended participant sound, provides an indicator to all client devices 22, etc.). In some arrangements, the control circuitry 104 provides both a conference sound response and a response to adjust user behavior.

Moreover, the particular operation of the control circuitry 104 may be modified (e.g., from original or default settings to new settings) thus enabling users (e.g., a presenter, an administrator, each attendee, etc.) to choose from a variety of behaviors (e.g., via a graphical user interface). Accordingly, users are able to tailor the operation of the electronic conference to provide the best user experience appropriate for particular situations and groups of participants. As a result, the conference server 24 is well equipped to apply the rule of social dynamics when providing customized electronic conference control.

To this end, it should be understood that the conference server 24 is constructed and arranged to identify, for each audio signal 72, a variety of contextual factors. In particular, the conference server 24 applies a set of heuristics to separately evaluate each contextual factor 150 of that audio signal 72. Once the contextual factors have been determined for that audio signal 72, the conference server 24 categorizes (or classifies) that audio signal 72 as representing intended participant sound or unintended participant sound, and delivers the set of conference signals 42 to the client devices 22 based on such categorization.

A short example listing of particular contextual factors which are suitable for categorizing each audio signal 72 as representing intended participant sound or unintended participant sound is provided below.

Identification of a current active speaker
    Detection of sound from multiple microphones (conference phones, smart phones, etc.)
    Detection of language (word detection)
    Evaluation and comparison of sound volume
    Evaluation of sound repetitiveness
    Evaluation of sound duration
    Evaluation of microphone type
    Evaluation of participation level
    Evaluation of special application settings and/or activity
    Detection of keyboard sound
    Detection of whether user is in front of webcam
    Evaluation of user's role
    Evaluation of sound history
    Evaluation of location (e.g., via GPS circuitry, routing address, etc.)
    Evaluation of location movement (e.g., in moving car, walking, etc.)

Other contextual factors are suitable for use as well, or may be combined with those listed above.

In connection with identification of the current active speaker, the conference server 24 may more likely categorize an audio signal 72 from a participant who is the current active speaker as providing intended participant sound. The audio signal 72 of the current active speaker is easy to identify since the audio signal 72 typically carries a user's voice for relatively long amounts of time with few interruptions.

In connection with detection of sound from multiple microphones, the conference server 24 may more likely categorize an audio signal 72 from a participant who is using multiple microphones as providing unintended participant sound. In particular, devices such as smart phones and conference phone may be provisioned with extra microphones which are susceptible to picking up background noise (e.g., papers moving, crowd noise, etc.) which, if simply allowed to continue as is, would reduce the quality of the experience.

In connection with detection of language, the conference server 24 may more likely categorize an audio signal 72 carrying human language as representing intended participant sound. An audio signal 72 carrying human language is easy to detect with availability of voice filters, speech recognition tools, etc.

Additionally, the conference server 24 is able to categorize an audio signal 72 as representing intended participant sound or unintended participant sound based, at least in part, on particular sound attributes such as sound volume, duration, participation level, etc. In particular, the conference server 24 is able to compare these sound attributes to predefined thresholds, to each other, etc. to determine which audio signals 72 represent intended participant sound and which audio signals 72 represent unintended participant sound.

Furthermore, the conference server 24 is able to categorize an audio signal 72 as representing intended participant sound or unintended participant sound based, at least in part, on other sound factors such as sound repetitiveness, the presence of keyboard noise and other non-human noises, etc.

It should be understood that other information is suitable for use as well. In particular, the conference server 24 may consider non-audio factors when categorizing each audio signal 72. For example, when a participant provides both a video signal 70 and an audio signal 72 (see set of participant signals 40 in FIG. 3), the conference server 24 may more likely categorize that audio signal 72 as representing intended participant sound if there is a user (or user movement) in the video image of the video signal 72. As another example, when a participant provides location data (e.g., GPS data, router/cell data, etc., also see additional signals 74 in FIG. 3) and an audio signal 72, the conference server 24 may more likely categorize the audio signal 72 as representing unintended participant sound if the location data indicates a location having a large amount of noise or if the location data indicates location movement by the user.

Figure 4:
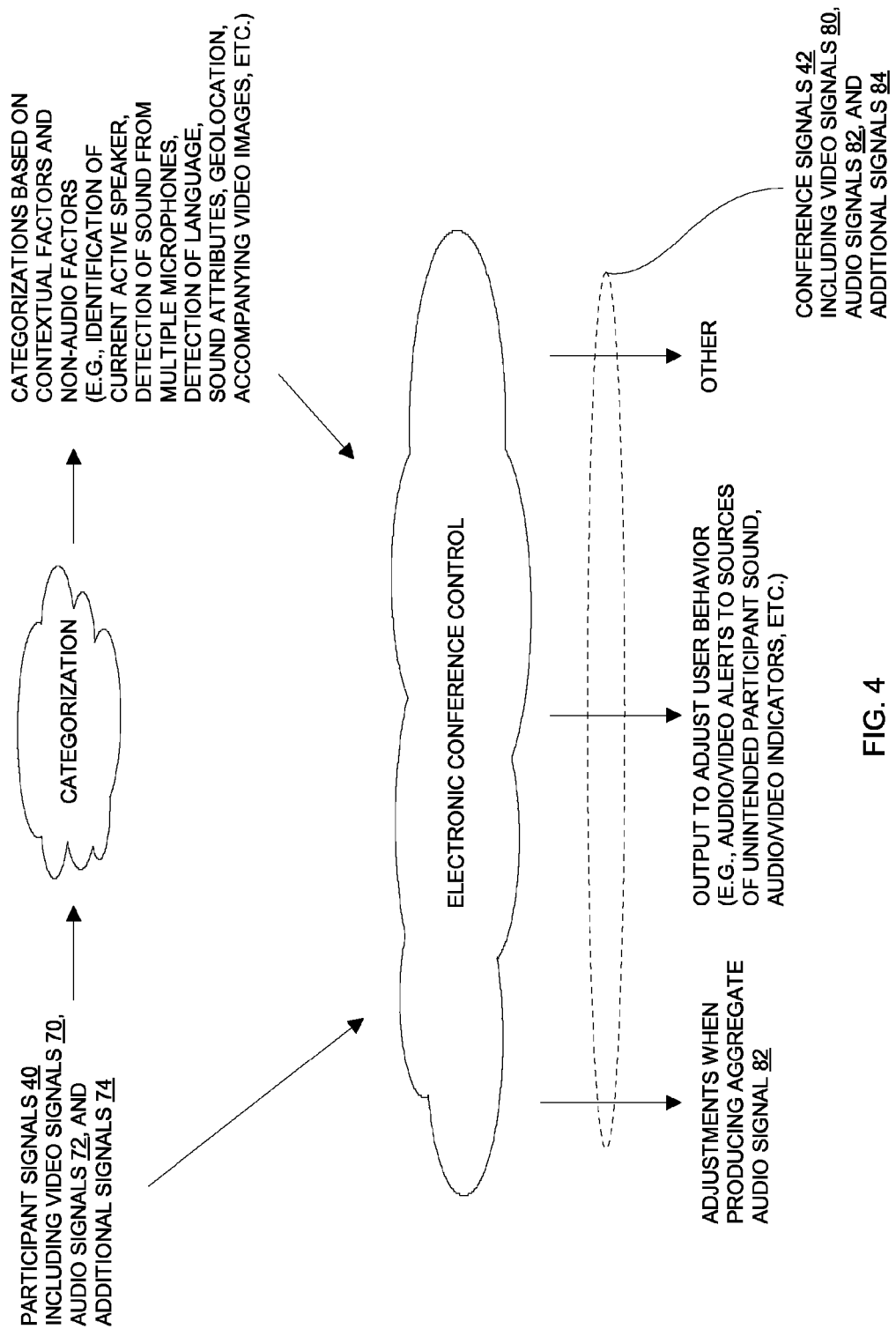
FIG. 4 is a diagram of showing particular operations which are capable of being controlled via the electronic environment of FIG. 1.

FIG. 4 shows diagrammatically how the conference server 24 identifies a set of contextual factors, and then uses the set of contextual factors to categorize each audio signal 72. Such operation occurs in an ongoing manner and in real time, e.g., where the conference server 24 continuously updates a set of categorization results (also see the other status and data 114 in FIG. 3). With the results of such categorization available, the conference server 24 controls further operation of the electronic conference based on the categorization results.

For example, the conference server 24 is able to make adjustments to the aggregate audio signal 82 which is transmitted back to the client devices 22 (FIGS. 1 and 2). Along these lines, the conference server 24 may reduce the volume levels of audio signals 72 categorized as representing unintended participant sound. The conference server 24 may also reduce the volume levels of one or more audio signals 72 categorized as representing intended participant sound if those other audio signals 72 are not deemed to be the current active speaker, and so on.

As another example, the conference server 24 is able to provide output to adjust user behavior. Along these lines, the conference server 24 may adjust a video image (e.g., add an alert, a flag, a warning, etc.) in video conference signals 80 that are associated with participants who are also sources of audio signals 72 categorized as representing unintended participant sound. Alternatively, the conference server 24 may add a special sound to the audio conference signal 82 that is sent to participants who are also sources of audio signals 72 categorized as representing unintended participant sound. It should be understood that the conference server 24 is capable of providing combinations of these alternatives as well as other alternatives.

Moreover, other remedial activities are suitable as well. For example, the various categorization results can be stored or post processed to generate reports, etc. and provided back to the participants in the form of feedback.

It should be understood that, in some arrangements, the conference server 24 operates in a staged or pipelined manner. In these arrangements, the conference server 24 preprocesses the set of audio signals 72 to determine whether any conflict exists (i.e., a first stage). In particular, the conference server 24 analyzes the set of audio signals 72 to determine whether at least two audio signals concurrently represent audio activity (e.g., human talking, noise, etc.) prior to categorizing the set of audio signals 72 received from the set of participants 30. The conference server 24 then categorizes the set of audio signals 72 only in response to a determination that at least two audio signals simultaneously represent audio activity (i.e., a second stage). That is, the conference server 24 performs categorization only when there is detection of simultaneous audio activity among the audio signals 72, e.g., to save processing resources. Following categorization, the conference server 24 performs an adjustment operation, e.g., adjusts the aggregate audio signal 82, adjusts user behavior, etc. (i.e., a third stage). As a result, any potential conflict is detected and resolved to improve the quality of the experience. Further details will now be provided with reference to FIG. 5.

Figure 5:
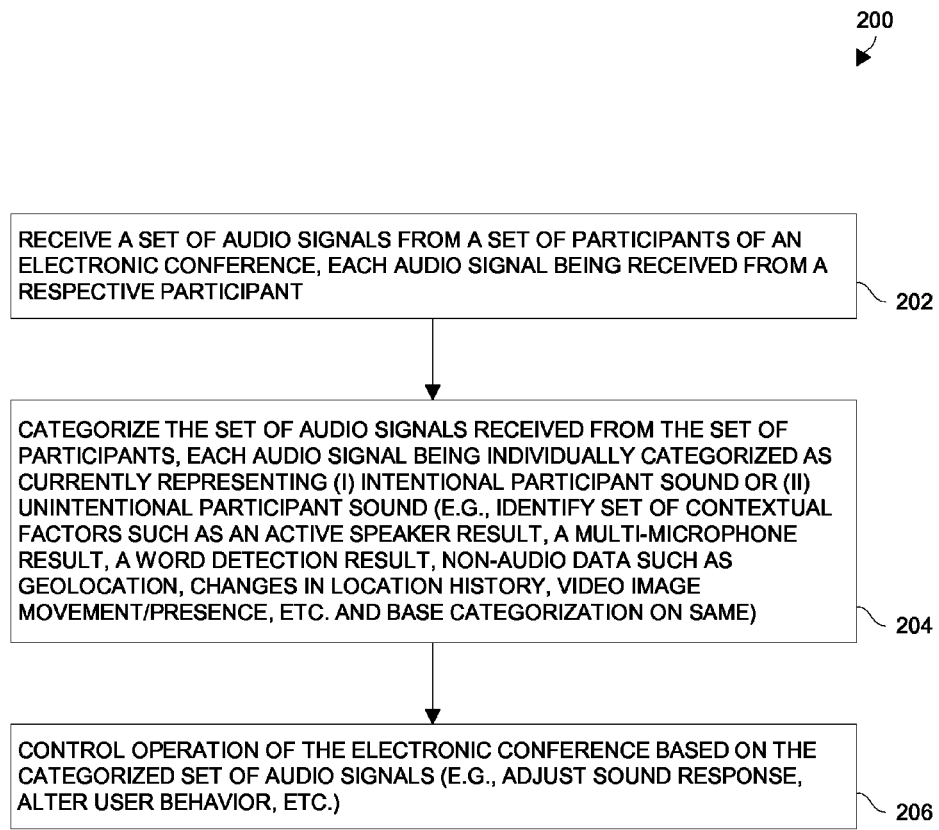
FIG. 5 is a flowchart of a procedure which is performed by the electronic environment of FIG. 1.

FIG. 5 is a flowchart of a procedure 200 which is performed by the conference server 24 when managing an electronic conference. In step 202, the conference server 24 receives a set of audio signals 72 from a set of participants 30 of the electronic conference where each audio signal 72 is received from a respective participant 30. As mentioned earlier, the audio signals 72 may be captured by microphones on various types of client devices 22 (e.g., headsets, tablets, smart phones, etc.).

In step 204, the conference server 24 categorizes the set of audio signals 72 received from the set of participants 30. In particular, each audio signal 72 is individually categorized as currently representing (i) intentional participant sound or (ii) unintentional participant sound. As mentioned above, such categorization may be based, at least in part, on a set of contextual factors for each audio signal 72.

In step 206, the conference server 24 controls the operation of the electronic conference based on the categorized set of audio signals 72. For example, the conference server 24 modifies/adjusts the conference sound response and/or user behavior. As a result, the conference server 24 is able to enhance the quality of the experience of the participants 30. Accordingly, based on the type of sound determined in each audio signal 72 and its likelihood of being intentional, the conference server 24 is able to respond by adjusting the conference sound response (i.e., the conference audio signal 82) or by seeking to alter user behavior. Such adjustments to the conference sound response may include dynamically lowering a person's microphone input volume, excluding certain sounds such as keystrokes, or muting that person's microphone channel. Additionally, seeking to adjust the user behavior may include offering different types of appropriate feedback such as playing a sound or providing a visual graphic (e.g., displaying various degrees of messages) to users suspected of making unintentional noise.

As described above, improved techniques are directed to controlling an electronic conference based on detection of intended versus unintended sound. In particular, audio signals 72 from conference participants 30 are categorized as representing either intentional participant sound or unintentional participant sound using contextual factors. Such contextual factors may include language/word detection, sound volume, sound repetitiveness, sound duration, sound history/participation level, participant location, comparison results to determine the current active speaker, etc. Once the audio signals 72 have been categorized, a variety of actions are available to enhance the quality of the experience such as adjusting sound levels (e.g., modifying aspects of audio signals categorized as currently carrying unintentional participant sound), altering user behavior (e.g., outputting an alert or indicator), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that one or more of the operations that was described above as being performed by the conference server 24 can be alternatively performed by the client devices 22. Along these lines, the client devices 22 may perform pre-filtering or auto-muting of particular sounds or of the entire audio signal 72 at times based on processing similar to that described above in connection with the conference server 24. Additionally, alerts or indicators, filtering, and so on can be performed locally by the client devices 22 during receipt and rendering of the set of conference signals 42 from the conference server 24. Such operation offloads the responsibility of such processing from the conference server 24 onto the client devices 22 thus improving server efficiency (i.e., reducing server workload) and distributing control among participating devices which such control can be further tailored by the individual users 30. Such modifications and enhancements are intended to belong to various embodiments of the disclosure.

What is claimed is:

1. In an electronic device, a method of managing an electronic conference, the method comprising:
   receiving a set of audio signals from a set of participants of the electronic conference, each audio signal being received from a respective participant;
   analyzing the set of audio signals to determine whether at least two audio signals simultaneously represent audio activity;
   categorizing the set of audio signals received from the set of participants, each audio signal being individually categorized as currently representing (i) intentional participant sound or (ii) unintentional participant sound, wherein categorizing the set of audio signals is performed by the electronic device only in response to a determination that at least two audio signals simultaneously represent audio activity; and
   controlling operation of the electronic conference based on the categorized set of audio signals.

2. A method as in claim 1 wherein categorizing the set of audio signals includes:
   identifying a set of contextual factors of a particular audio signal from a particular participant, and
   providing a categorization result for the particular audio signal based on the set of contextual factors.

3. A method as in claim 2 wherein identifying the set of contextual factors of the particular audio signal from the particular participant includes:
   outputting, as a contextual factor, an active speaker result indicating whether the particular participant is actively speaking, the categorization result for the particular audio signal being based, at least in part, on the active speaker result.

4. In an electronic device, a method of managing an electronic conference, the method comprising:
   receiving a set of audio signals from a set of participants of the electronic conference, each audio signal being received from a respective participant;
   categorizing the set of audio signals received from the set of participants, each audio signal being individually categorized as currently representing (i) intentional participant sound or (ii) unintentional participant sound; and
   controlling operation of the electronic conference based on the categorized set of audio signals;
   wherein categorizing the set of audio signals includes:
      identifying a set of contextual factors of a particular audio signal from a particular participant, and
      providing a categorization result for the particular audio signal based on the set of contextual factors; and
   wherein identifying the set of contextual factors of the particular audio signal from the particular participant includes:
      outputting, as a contextual factor, a multi-microphone result indicating whether the particular participant is using multiple microphones, the categorization result for the particular audio signal being based, at least in part, on the multi-microphone result.

5. A method as in claim 2 wherein identifying the set of contextual factors of the particular audio signal from the particular participant includes:
   outputting, as a contextual factor, a speech recognition result indicating whether the particular audio signal includes particular human speech, the categorization result for the particular audio signal being based, at least in part, on the speech recognition result.

6. A method as in claim 2, further comprising:
   receiving non-audio data from the particular participant, and wherein the categorization result for the particular audio signal from the particular participant is based on (i) the set of contextual factors and (ii) a set of non-audio factors identified by the non-audio data received from the particular participant.

7. In an electronic device, a method of managing an electronic conference, the method comprising:
   receiving a set of audio signals from a set of participants of the electronic conference, each audio signal being received from a respective participant;
   categorizing the set of audio signals received from the set of participants, each audio signal being individually categorized as currently representing (i) intentional participant sound or (ii) unintentional participant sound; and
   controlling operation of the electronic conference based on the categorized set of audio signals;
   wherein categorizing the set of audio signals includes:
      providing a categorization result for a particular audio signal from a particular participant based on a geographical location of the particular participant.

8. In an electronic device, a method of managing an electronic conference, the method comprising:
   receiving a set of audio signals from a set of participants of the electronic conference, each audio signal being received from a respective participant;
   categorizing the set of audio signals received from the set of participants, each audio signal being individually categorized as currently representing (i) intentional participant sound or (ii) unintentional participant sound; and
   controlling operation of the electronic conference based on the categorized set of audio signals;

wherein categorizing the set of audio signals includes:
providing a categorization result for a particular audio signal from a particular participant based on a video image from the particular participant.

9. In an electronic device, a method of managing an electronic conference, the method comprising:
receiving a set of audio signals from a set of participants of the electronic conference, each audio signal being received from a respective participant;
categorizing the set of audio signals received from the set of participants, each audio signal being individually categorized as currently representing (i) intentional participant sound or (ii) unintentional participant sound; and
controlling operation of the electronic conference based on the categorized set of audio signals;
wherein categorizing the set of audio signals includes:
identifying a set of contextual factors of a particular audio signal from a particular participant, and
providing a categorization result for the particular audio signal based on the set of contextual factors; and
wherein categorizing the set of audio signals includes:
providing a categorization result for a particular audio signal from a particular participant based on a location history of the particular participant, the part, on the location history of the particular participant.

10. A method as in claim 1 wherein the electronic device is constructed and arranged to mix the set of audio signals to produce an aggregate audio signal; and wherein controlling the operation of the electronic conference includes:
based on the categorized set of audio signals, adjusting a set of volume levels of the set of audio signals as the set of audio signals are mixed to produce the aggregate audio signal.

11. A method as in claim 10 wherein adjusting the set of volume levels includes:
reducing individual volume levels of audio signals categorized as currently representing unintentional sound, and
maintaining an individual volume level of at least one audio signal categorized as currently representing intentional sound.

12. A method as in claim 11 wherein maintaining the individual volume level of at least one audio signal categorized as currently representing intentional sound includes:
maintaining the individual volume levels of all of the audio signals categorized as currently representing intentional sound.

13. A method as in claim 11 wherein maintaining the individual volume level of at least one audio signal categorized as currently representing intentional sound includes:
reducing the individual volume level of a first audio signal categorized as currently representing intentional sound, and concurrently maintaining the individual volume level of a second audio signal categorized as currently representing intentional sound.

14. A method as in claim 1 wherein the electronic device is constructed and arranged to output a video conference signal to the set of participants; and wherein controlling the operation of the electronic conference includes:
based on the categorized set of audio signals, adjusting a video image of the video conference signal.

15. A method as in claim 14 wherein adjusting the video image of the video conference signal includes:
modifying an initial video image to form a modified video image, the modified video image containing an alert indicating that a source of unintentional sound exists, and the initial video image not containing the alert indicating that the source of unintentional sound exists.

16. A method as in claim 15 wherein controlling the operation of the electronic conference further includes:
transmitting the modified video image to all of the participants of the electronic conference.

17. A method as in claim 15 wherein controlling the operation of the electronic conference further includes:
transmitting the modified video signal to participants providing audio signals categorized as currently representing unintentional sound, and
transmitting the initial video signal to at least one participant providing an audio signal categorized as currently representing intentional sound.

18. An electronic apparatus to manage an electronic conference, comprising:
a network interface;
memory; and
control circuitry coupled to the network interface and the memory, the memory storing instructions which, when carried out by the control circuitry, cause the control circuitry to:
receive a set of audio signals from a set of participants of the electronic conference through the network interface, each audio signal being received from a respective participant,
analyze the set of audio signals to determine whether at least two audio signals simultaneously represent audio activity,
categorize the set of audio signals received from the set of participants, each audio signal being individually categorized as currently representing (i) intentional participant sound or (ii) unintentional participant sound, wherein the control circuitry categorizes the set of audio signals only in response to a determination that at least two audio signals simultaneously represent audio activity, and
control operation of the electronic conference based on the categorized set of audio signals.

19. A computer program product having a non-transitory computer readable medium which stores a set of instructions to manage an electronic conference, the set of instructions, when carried out by computerized circuitry, causing the computerized circuitry to perform a method of:
receiving a set of audio signals from a set of participants of the electronic conference, each audio signal being received from a respective participant;
analyzing the set of audio signals to determine whether at least two audio signals simultaneously represent audio activity;
categorizing the set of audio signals received from the set of participants, each audio signal being individually categorized as currently representing (i) intentional participant sound or (ii) unintentional participant sound, wherein categorizing the set of audio signals is performed by the computerized circuitry only in response to a determination that at least two audio signals simultaneously represent audio activity; and
controlling operation of the electronic conference based on the categorized set of audio signals.

20. An electronic apparatus as in claim 18 wherein the control circuitry, when categorizing the set of audio signals, is constructed and arrange to provide a categorization result for a particular audio signal from a particular participant based on at least one of: (i) a geographical location of the particular participant, (ii) a video image from the particular participant, and (iii) a location history of the particular participant.

21. A computer program product as in claim 19 wherein categorizing the set of audio signals includes:

providing a categorization result for a particular audio signal from a particular participant based on at least one of:
(i) a geographical location of the particular participant,
(ii) a video image from the particular participant, and
(iii) a location history of the particular participant.

* * * * *